United States Patent
Van Mierloo et al.

(10) Patent No.: US 10,214,627 B2
(45) Date of Patent: Feb. 26, 2019

(54) STABILISED RESIN COMPOSITION

(71) Applicant: SABIC GLOBAL TECHNOLOGIES B.V., Bergen op Zoom (NL)

(72) Inventors: Sarah Van Mierloo, Geleen (NL); Jacques Theodorus Elisabeth Hubertina Sampers, St. Odiliënberg (NL)

(73) Assignee: SABIC Global Technologies B.V., Bergen Op Zoom (NL)

( * ) Notice: Subject to any disclaimer, the term of this patent is extended or adjusted under 35 U.S.C. 154(b) by 140 days.

(21) Appl. No.: 15/311,032

(22) PCT Filed: May 13, 2015

(86) PCT No.: PCT/EP2015/060615
§ 371 (c)(1),
(2) Date: Nov. 14, 2016

(87) PCT Pub. No.: WO2015/173315
PCT Pub. Date: Nov. 19, 2015

(65) Prior Publication Data
US 2017/0088689 A1    Mar. 30, 2017

(30) Foreign Application Priority Data

May 15, 2014 (EP) .................... 14168526

(51) Int. Cl.
| | | |
|---|---|---|
| *C08K 5/05* | (2006.01) | |
| *C08K 5/00* | (2006.01) | |
| *C08L 23/12* | (2006.01) | |
| *C08K 3/34* | (2006.01) | |
| *C08K 5/105* | (2006.01) | |
| *C08K 5/13* | (2006.01) | |
| *C08K 5/3435* | (2006.01) | |
| *C08K 5/37* | (2006.01) | |
| *C08K 5/524* | (2006.01) | |

(52) U.S. Cl.
CPC ............... *C08K 5/005* (2013.01); *C08K 3/34* (2013.01); *C08K 5/105* (2013.01); *C08K 5/13* (2013.01); *C08K 5/3435* (2013.01); *C08K 5/37* (2013.01); *C08K 5/524* (2013.01); *C08L 23/12* (2013.01); *C08L 2201/08* (2013.01)

(58) Field of Classification Search
CPC ...... C08K 5/005; C08K 5/105; C08K 5/3435; C08K 5/37; C08K 5/13; C08K 5/24; C08K 3/34; C08L 23/12
See application file for complete search history.

(56) References Cited

U.S. PATENT DOCUMENTS

| | | |
|---|---|---|
| 5,081,170 A | 1/1992 | Yagi et al. |
| 5,124,456 A | 6/1992 | Carette et al. |
| 7,291,669 B2 * | 11/2007 | Botkin ............... C08K 5/13 524/123 |
| 2010/0286310 A1 | 11/2010 | Lederer et al. |
| 2011/0076905 A1 | 3/2011 | Mussig et al. |

FOREIGN PATENT DOCUMENTS

| | | |
|---|---|---|
| DE | 102008026672 A1 | 12/2009 |
| EP | 1088871 A1 | 4/2001 |

OTHER PUBLICATIONS

Allen et al., "Interactions of antioxidants with hindered piperidine compounds in the thermal and photochemical oxidation of polypropylene fime." Plastics and Rubber Processing and Applications;1985;5:259-265.
International Search Report; International Application No. PCT/EP2015/060615; International Filing Date May 13, 2015; dated Jul. 22, 2015, 5 pages.
Kikkawa et al., "Antagonism Between Hindered Amine Light Stabilizers and Sulfur-containing Compounds" Polymer Degraduation and Stability;1987;18:237-245.
Kikkawa, "New Development in Polymer Photostabilization" Polymer Degraduation and Stability;1995;49:135-143.
Malatesta et al., "High Heat and UV-Stabilization of Polyolefins under demanding conditions." Addcon World, the 11th International Plastics Additives and Modifiers Conference, Hamburg;2005.
Written Opinion of the International Searching Authority; International Application No. PCT/EP2015/060615; International Filing Date May 13, 2015; dated Jul. 22, 2015, 5 pages.

* cited by examiner

*Primary Examiner* — Peter D. Mulcahy
(74) *Attorney, Agent, or Firm* — Cantor Colburn LLP

(57) ABSTRACT

The invention is directed to a resin composition that has both high heat resistance and high resistance against ultraviolet radiation. The invention is further directed to an article comprising said composition, and to the use of a combination of compounds for stabilising a resin composition. The resin composition of the invention comprises (A) a polypropylene resin, (B) an optionally substituted linear or branched alkyl ester of 3-(alkylated 4'-hydroxyphenyl) propionic acid having a molecular weight of 750 g/mol or less, (C) a hindered amine light stabiliser, having a molecular weight of 1250 g/mol or more, wherein the hindered amine is comprised in the backbone of the hindered amine light stabiliser molecule, and (D) a thiosynergist.

31 Claims, No Drawings

STABILISED RESIN COMPOSITION

This application is a national stage application of PCT/EP2015/060615 filed May 13, 2015, which claims priority to European Applications EP14168526.3 filed May 15, 2014, both of which are hereby incorporated by reference in their entirety.

The invention relates to a resin composition that has both high heat resistance and high resistance against ultraviolet radiation. The invention is further directed to an article comprising said composition, and to the use of a combination of compounds for stabilising a resin composition.

Polypropylene resins deteriorate by, for example, heat, light and oxygen. In particular the mechanical strength can be decreased and the polypropylene material can become coloured.

In order to prevent such deterioration of a polypropylene composition, there have been proposed a number of additives, used either alone or in various combinations.

Phenolic antioxidant (PAO) additives are widely employed to protect polypropylene against thermo-oxidative degradation during processing and in service conditions. Even though phenolic antioxidants offer good stabilisation of polypropylene, most phenolic antioxidants exhibit the disadvantage of yellowing due to their oxidation to coloured quinonoid compounds by air or $NO_x$ gases. Furthermore, the phenolic antioxidants often exert only a limited effect when employed alone. Therefore phenolic antioxidants have been used in combination with other compounds. For example, phenolic antioxidants have been used in combination with phosphites which are known to enhance the effectiveness of the phenolic antioxidants due to complementary and synergistic mechanisms of action (e.g. decomposition of hydroperoxides formed in the polymer at high temperature and in the presence of oxygen). Also, phenolic antioxidants have been combined with sulphur containing antioxidants such as a dialkyl thiodipropionate in order to achieve increased heat performance.

Phenolic antioxidants have also been combined with various light stabilisers in order to achieve a high weather resistance. Examples of light stabilisers include benzophenone, benzotriazole and triazine type ultraviolet radiation absorbers, hindered hydroxy-benzoates and hindered amine compounds. In particular, the application of hindered amine light stabilisers (HALS) has been more and more increased since they are non-colouring, exert a high photostabilising effect and also can improve the heat resistance.

However, providing adequate protection to polymer systems exposed to both severe ultraviolet radiation and high heat in service conditions still remains a challenge. For instance, applications such as automotive interior instrument panels, A/B pillars, dashboards or scuff plates are particularly demanding and require high performing stabilising formulations to fulfil increased requirements in these applications.

In order to comply with severe heat and UV requirements, it is generally known that combination of PAO with HALS and sulphur containing antioxidants are used. However light stability will be reduced due to an antagonistic interaction between the sulphur containing antioxidants and HALS. A solution for this interaction problem could be the application of low basicity HALS. This route however in many cases does not provide the required performance (Kikkawa et al., *Polym. Deg. Stab.* 1987, 18, 237-245 and Kikkawa, *Polym. Deg. Stab.* 1995, 49, 135-143). Another solution has been proposed involving the use of (hindered) hydroxy-benzoate type stabilisers (Malatesta et al. from Cytec Industries Inc., Stamford, USA for instance presented "High heat and UV stabilization of polyolefins under demanding conditions" at Addcon conference in Hamburg in 2005). Yet another solution is proposed by introducing specific monocarboxylates (U.S. Pat. No. 5,081,170). Furthermore, in these combinations, to obtain sufficient UV stability, the presence of low molecular weight HALS is generally considered essential. Unfortunately, stabiliser packages combining phenolic antioxidants/thiosynergist and only high molecular weight HALS are generally not fulfilling high thermal stability and demanding light stability requirements.

EP-A-1 088 871 describes a pressure sensitive adhesive tape, which may have an olefin-based resin layer laminated between a urethane resin layer and a pressure-sensitive adhesive layer. Additives such as photostabilisers and antioxidants may also be used. EP-A-1 088 871 is not directed to improving weathering resistance combined with desirable mechanical properties and does not disclose the additional presence of a thiosynergist.

U.S. Pat. No. 5,214,456 is directed to dihydropyridines for the heat and light stabilisation of organic polymers. The compositions disclosed in U.S. Pat. No. 5,214,456 can contain additives, such as photostabilisers and antioxidants. U.S. Pat. No. 5,214,456 does not disclose the additional presence of a thiosynergist.

DE-A-10 2008 026 672 describes an adhesive made from a specific isotactic polypropylene resin. The adhesive can contain additives, such as primary and secondary antioxidants, and fillers. DE-A-10 2008 026 672 is not directed to improving weathering resistance combined with desirable mechanical properties and does not disclose the additional presence of a thiosynergist.

Objective of the invention is to address this problem by providing a resin composition with improved resistance against both ultraviolet radiation and heat.

The inventors found that this objective can, at least in part, be met when a specific combination of additives is used.

Accordingly, in a first aspect the invention is directed to a resin composition comprising
(A) a polypropylene resin,
(B) an optionally substituted linear or branched alkyl ester of 3-(alkylated 4'-hydroxyphenyl) propionic acid having a molecular weight of 750 g/mol or less,
(C) a hindered amine light stabiliser (HALS), having a molecular weight of 1250 g/mol or more, wherein the hindered amine is comprised in the backbone of the hindered amine light stabiliser molecule, and
(D) a thiosynergist.

Thus, in component (C) the hindered amine functionality is comprised in the backbone of the hindered amine light stabiliser molecule.

The term "a propylene resin" is to be interpreted as meaning a single type of polypropylene resin or as a mixture of different types of polypropylene resins.

A polypropylene resin as meant herein is interchangeable with the term polypropylene polymer or polypropylene.

It was surprisingly found that this combination of components results in a composition showing minimal surface oxidation when exposed to UV-radiation and thus having excellent weathering resistance. In addition, the composition retains desirable mechanical properties (such as Izod impact strength and tensile strength) when exposed to high heat.

The resin composition of the invention may further preferably comprise one or more of the following components: a second phenolic antioxidant (E) which is different from the first phenolic antioxidant (B), and a third antioxidant (F)

selected from the group consisting of secondary antioxidants (such as a phosphite) and different from antioxidants (B) and (E).

The polypropylene resin in the resin composition of the invention is a polymer based on propylene as the single or predominantly present monomer. The polypropylene resin may be a homopolymer, a copolymer or a random copolymer. The copolymer may be a heterophasic propylene copolymer having a matrix phase and a disperse phase. Such polymers are known to the skilled person. The polypropylene resin may be a mixture, or blend, of at least two polypropylene resins.

In an embodiment where the polypropylene resin is a heterophasic propylene copolymer, the matrix phase consists of a propylene homopolymer or a propylene—α-olefin copolymer with a comonomer content of at most 2 wt. % based on the weight of matrix phase. Preferably though the matrix phase consists of a propylene homopolymer. The disperse phase consists of a propylene/α-olefin copolymer. The α-olefin is preferably selected from the group consisting of ethylene, butylene, hexene and octene and most preferably is ethylene. The amount of disperse phase may vary within wide limits depending on the desired mechanical properties of the resin composition. The amount of disperse phase may be from 5-50 wt. %, such as from 10-40 wt. % or from 15-25 wt. % based on the weight of the heterophasic propylene copolymer. The amount of α-olefin comonomer in the propylene—α-olefin copolymer of the disperse phase may be from 15-65 wt. % such as from 20-60 wt. % or 40-55 wt. % based on the weight of the disperse phase.

The polypropylene polymer can be a polymer made by any known polymerisation technique as well as with any known polymerisation catalyst system. Regarding the techniques, reference can be given to slurry, solution or gas-phase polymerisations; regarding the catalyst system reference can be given to Ziegler-Natta, metallocene, or (other) single-site catalyst systems. All are, in themselves, known in the art.

Preferably, the polypropylene polymer has a melt flow index (MFI), measured according to ISO 1133 at 230° C. and 2.16 kg, of between 0.1 and 100.

In a further embodiment, the resin composition of the invention comprises
(A) a polyethylene resin,
(B) an optionally substituted linear or branched alkyl ester of 3-(alkylated 4'-hydroxyphenyl) propionic acid having a molecular weight of 750 g/mol or less,
(C) a hindered amine light stabiliser (HALS), having a molecular weight of 1250 g/mol or more, wherein the hindered amine (functionality) is comprised in the backbone of the hindered amine light stabiliser molecule, and
(D) a thiosynergyst.

Such a polyethylene resin (A) can comprise a polymer based on ethylene as the single or predominantly present monomer, or in other words: the polymer is either a homopolymer, a copolymer or a random copolymer.

In yet a further embodiment, it is possible that component (A) is a blend of a polypropylene resin and a polyethylene resin.

The phenolic antioxidant (B) has a molecular weight of 750 g/mol or less as determined by gel permeation chromatography preferably 600 g/mol or less, more preferably 550 g/mol or less. The phenolic antioxidant (B) is an optionally substituted linear or branched alkyl ester of 3-(alkylated 4'-hydroxyphenol) propionic acid. The phenolic antioxidant (B) may have one or more substituents on the phenol group. Suitably, the phenolic antioxidant (B) can be a hindered phenolic antioxidant. Such hindered phenolic antioxidants can, for example, have one or two alkyl groups (preferably t-butyl groups) on the phenol ring in ortho position with respect to the hydroxyl group.

Suitably, the phenolic antioxidant (B) comprises an alkyl ester (i.e. propionic) group. For example, the phenolic antioxidant (B) may comprise a $C_{8-24}$ alkyl ester (i.e. propionic) group, preferably a $C_{12-20}$ alkyl ester group, more preferably a $C_{14-18}$ alkyl ester (i.e. propionic) group. The alkyl group is preferably a linear alkyl group. In other words, the phenolic antioxidant (B) comprises an alkyl propionate group.

Advantageously, the phenolic antioxidant (B) has only one phenolic group per molecule.

Preferred phenolic antioxidants (B) with only one phenolic group per molecule are $C_{1-20}$-3-(3,5-di-t-butyl-4-hydroxyphenyl)propionates, preferably selected from the group consisting of methyl-3-(3,5-di-t-butyl-4-hydroxyphenyl)propionate, octyl-3-(3,5-di-t-butyl-4-hydroxyphenyl)propionate, isooctyl-3-(3,5-di-t-butyl-4-hydroxyphenyl)propionate, tridecyl-3-(3,5-di-t-butyl-4-hydroxyphenyl)propionate, tetradecyl-3-(3,5-di-t-butyl-4-hydroxyphenyl)propionate, pentadecyl-3-(3,5-di-t-butyl-4-hydroxyphenyl)propionate, hexadecyl-3-(3,5-di-t-butyl-4-hydroxyphenyl)propionate, heptadecyl-3-(3,5-di-t-butyl-4-hydroxyphenyl)propionate, octadecyl-3-(3,5-di-t-butyl-4-hydroxyphenyl)propionate, and nonadecyl-3-(3,5-di-t-butyl-4-hydroxyphenyl)propionate. More preferably, the phenolic antioxidant (B) is selected from the group consisting of octadecyl-3-(3,5-di-t-butyl-4-hydroxyphenyl)propionate, octyl-3-(3,5-di-t-butyl-4-hydroxyphenyl)propionate, isooctyl-3-(3,5-di-t-butyl-4-hydroxyphenyl)propionate, tridecyl-3-(3,5-di-t-butyl-4-hydroxyphenyl)propionate, tetradecyl-3-(3,5-di-t-butyl-4-hydroxyphenyl)propionate, and pentadecyl-3-(3,5-di-t-butyl-4-hydroxyphenyl)propionate.

In an embodiment, the phenolic antioxidant (B) is octadecyl-3-(3,5-di-t-butyl-4-hydroxyphenyl)propionate.

Some non-limiting examples of the phenolic antioxidant (B) with two phenolic groups per molecule include tri-ethylene-glycol-bis-3-(t-butyl-4-hydoxy-5-methyl-phenyl)-propionate and 1,6-hexane-diol-bis-3-(3,5-di-t-butyl-4-hydoxyphenyl)-propionate.

Many phenolic antioxidants (B) are also commercially available. Some examples include Anox® BF (3,5-bis(1,1-dimethyl-ethyl)-4-hydroxy benzene propanic ester of a $C_{14}$-$C_{15}$ alcohol blend, available from Great Lakes Chemical Company), Irganox® 245 (triethylene glycol bis(3-t-butyl-4-hydroxy-5-methylphenyl)propionate, available from BASF), Irganox® 259 (hexamethylene bis[3-(3,5-di-t-butyl-4-hydroxyphenyl)propionate], available from BASF), Irganox® 1076 (octadecyl-3-(3,5-di-t-butyl-4-hydroxyphenyl)propionate, available from BASF), and Irganox® 1135 (octyl-3-(3,5-di-t-butyl-4-hydroxyphenyl)propionate, available from BASF).

The amount of the phenolic antioxidant (B) in the resin composition of the invention can vary and may, for instance, be 0.01-1% by total weight of the resin composition, such as 0.05-0.9% by total weight of the resin composition, or 0.1-0.4% by total weight of the resin composition.

The resin composition of the invention further comprises a specific hindered amine light stabiliser (C). It has been reported that considering UV-ageing, certain combinations of phenolic antioxidants and hindered amine light stabilisers show a synergistic effect while others show an antagonistic effect (Allen et al. in Plastics and rubber processing and applications, 1985, vol. 5(3), 259-265). Unfortunately, whether the effect is synergistic or antagonistic has not yet scientifically been resolved, but seems dependent on the type of phenolic antioxidant and hindered amine light stabiliser. The inventors surprisingly found that the combination of phenolic antioxidant (B) and hindered amine light stabiliser (C) in the resin compositions of the invention show a synergistic effect, both in maintaining good mechanical properties upon heat exposure, and in offering good resistance against exposure to ultraviolet radiation. This effect is stronger than combinations of (B) with other high molecular weight HALS known in the art.

The hindered amine light stabiliser (C) preferably has a number average molecular weight of 1250 g/mol or more as determined by gel permeation chromatography, such as 1300 g/mol or more, preferably from 1500-4000 g/mol.

In a preferred embodiment, the resin composition of the invention is substantially free from hindered amine light stabilisers having a molecular weight of less than 1250 g/mol. More preferably, the resin composition of the invention is substantially free from hindered amine light stabilisers having a molecular weight of less than 1000 g/mol, such as hindered amine light stabilisers having a molecular weight of less than 750 g/mol. For example, the amount of such hindered amine light stabilisers in the resin composition of the invention can be 0.1% or less by weight of the resin composition, more preferably 0.05% or less, such as 0.01% or less, or 0.005% or less. Most preferably, the resin composition of the invention is completely free from such low molecular weight hindered amine light stabilisers. Low molecular weight hindered amine light stabilisers are in many cases undesirable, because they tend to migrate to the surface and can cause for example stickiness and blooming.

Suitably, the hindered amine light stabiliser (C) is an oligomeric hindered amine light stabiliser.

In the hindered amine light stabiliser (C), the hindered amine (functionality) is comprised in the backbone of the hindered amine light stabiliser molecule, rather than in pendant substituents that are attached to the backbone. Hence, in accordance with the invention, the nitrogen atom of the hindered amine group is part of the main chain of the hindered amine light stabiliser molecule. As commonly known by those skilled in the art, the term "hindered amine" refers to a compound or moiety in which one or more, preferably two or more, carbon atoms adjacent to the nitrogen atom of the amine group do not have a hydrogen atom attached directly thereto. Preferably, one or more carbon atoms (preferably two or more carbon atoms) adjacent to the hindered amine nitrogen atom are not carbonyl carbons (i.e., a carbon atom having an oxygen atom double bonded thereto). Typically, one or more carbon atoms, and preferably two or more carbon atoms, adjacent the amine nitrogen have a methyl substitution. Hindered amine light stabilisers include those comprising derivatives of 2,2,6,6-tetramethyl piperidine in the backbone.

Some examples of hindered amine light stabilisers, wherein the hindered amine (functionality) is not comprised in the backbone include Chimassorb 944, Chimassorb 119, Tinuvin NOR 371, and Uvinul 4050H. In each of these cases, the hindered amine is present in pendant substituents that are not part of the actual backbone but are pendant side groups of the backbone, while the amine that is present in the backbone is not a hindered amine.

Suitably, the hindered amine light stabiliser (C) is free from pendant piperidinyl groups (although piperidinyl groups may be present as part of the backbone). The hindered amine light stabiliser may be a polyester hindered amine light stabiliser. Since such polyester hindered amine light stabilisers are prone to photolytic and hydrolytic cleavage reactions, they are typically avoided for applications where resistance against ultraviolet radiation (weathering) is required. The inventors, however, found that the compositions of the invention, containing the combination of such polyester hindered amine light stabilisers with the additional components are resistant against heat but surprisingly also against ultraviolet radiation (weathering).

The hindered amine light stabiliser (C) preferably comprises a group according to formula (I) below in the backbone of the hindered amine light stabiliser molecule.

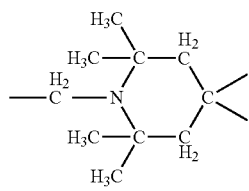

(I)

Preferably, the hindered amine light stabiliser (C) comprises a group according to formula (II) or (III) shown below in the backbone.

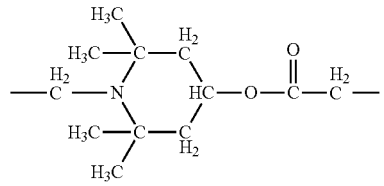

(II)

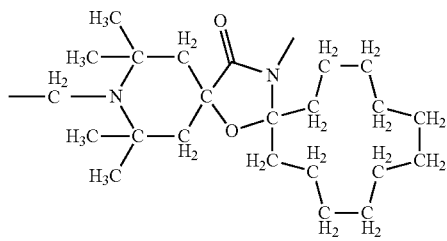

(III)

In a more preferred embodiment the hindered amine light stabiliser (C) is selected from the group consisting of

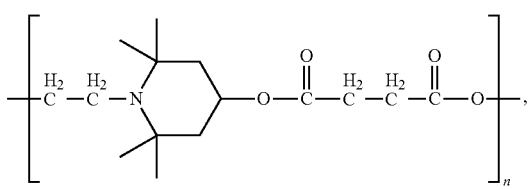

wherein n is selected in the range of 9-16, preferably in the range of 10-15, such as in the range of 11-14, and

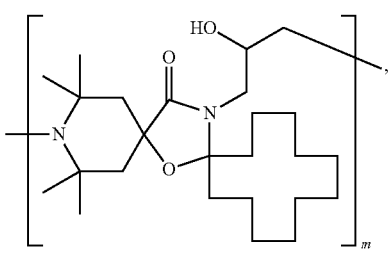

wherein m is selected in the range of 3-10, preferably in the range of 3-8, such as in the range 3-6, or in the range of 3-4.

Such hindered amine light stabilisers are commercially available, e.g., as Tinuvin® 622 (poly(4-hydroxy-2,2,6,6-tetramethyl-1-piperidine ethanol-alt-1,4-butanedioic acid), available from BASF) and Hostavin® N30 (polymer of 2,2,4,4-tetramethyl-7-oxa-3,20-diaza-dispiro [5.1.11.2]-heneicosan-21-on and epichlorohydrin, available from Clariant).

The amount of the hindered amine light stabiliser (C) in the resin composition of the invention can vary and may, for instance, be 0.01-1% by total weight of the resin composition, such as 0.05-0.9% by total weight of the resin composition, or 0.1-0.4% by total weight of the resin composition.

Preferably, the weight ratio of the hindered amine light stabiliser (C) and the phenolic antioxidant (B) in the resin composition of the invention is 3 or less, preferably 2 or less, more preferably 1 or less.

The resin composition of the invention may further comprise a thiosynergist (D). Thiosynergists are sulphur-based hydroperoxide decomposers and are well-known to the person skilled in the art. The thiosynergist may, for example, be selected from the group consisting of dilauryl thiodipropionate, distearyl thiodipropionate, dimyristyl thiodipropionate and ditridecyl thiodipropionate.

The preferred thiosynergist is distearyl thiodipropionate. The amount of the thiosynergist (D) in the resin composition of the invention can vary and may, for instance, be 0-0.1% by total weight of the resin composition, such as 0.01-0.08% by total weight of the resin composition, or 0.01-0.06% by total weight of the resin composition.

Apart from the phenolic antioxidant (B) which has a molecular weight of 750 g/mol or less, the resin composition of the invention may comprise a further phenolic antioxidant (E) which is different from (B).

Suitably, the further phenolic antioxidant (E) comprises two or more phenolic groups per molecule.

Some examples of suitable phenolic antioxidants (E) include pentaerythritol tetrakis(3-(3,5-di-t-butyl-4-hydroxyphenyl)propionate), tris(3,5-di-t-butyl-4-hydroxybenzyl) isocyanurate, and 1,3,5-trimethyl-2,4,6-tris(3,5-di-t-butyl-4-hydroxybenzyl)benzene. Such antioxidants increase the processing and long-term thermal stability of the resin composition of the invention.

Other examples of possible phenolic antioxidants (E) in the resin composition of the invention include 2,2'-methylenebis(4-methyl-6-t-butylphenol), 4,4'-butylidenebis(3-methyl-6-t-butylphenol), 4,4'-thiobis(3-methyl-6-t-butylphenol), 2,2'-thiobis(4-methyl-6-t-butylphenol), 4,4'-methylenebis(2,6-di-t-butylphenol), 2,2'-methylenebis[6-(1-methylcyclohexyl)-p-cresol], 2,2'-ethylidenebis(2,4-di-t-butylphenol), 2,2'-butylidenebis(2-t-butyl-4-methylphenol), 1,1,3-tris(2-methyl-4-hydroxy-5-t-butylphenyl)butane, triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,2-thiodiethylenebis[3-(3,5-di-t-butyl-4-hydroxyphenyl)propionate], N,N'-hexamethylenebis(3,5-di-t-butyl-4-hydroxyhydrocinnamide), 3,5-di-t-butyl-4-hydroxybenzylphosphonate-diethyl ester 1,3,5-tris(2,6-dimethyl-3-hydroxy-4-t-butylbenzyl)isocyanurate, 1,3,5-tris [(3,5-di-t-butyl-4-hydroxyphenyl)propionyloxyethyl] isocyanurate, tris(4-t-butyl-2,6-dimethyl-3-hydroxybenzyl) isocyanurate, 2,4-bis(n-octylthio)-6-(4-hydroxy-3,5-t-butylanilino)-1,3,5-triazine, tetrakis[methylene-3-(3,5-di-t-butyl-4-hydroxyphenyl)propionate] methane, bis(3,5-di-t-butyl-4-hydroxybenzylphosphonic acid ethyl ester) calcium, bis(3,5-di-t-butyl-4-hydroxybenzylphosphonic acid ethyl ester) nickel, bis[3,3-bis(3-t-4-hydroxyphenyl)butyric acid] glycol ester, N,N'-bis[3,5-di-t-butyl-4-hydroxyphenyl)propionyl]hydrazine, 2,2'-oxaimidobis[ethyl-3-(3,5-di-t-butyl-4-hydroxyphenyl)propionate], 2,2'-methylenebis(4-methyl-6-t-butylphenol)terephthalate, 1,3,5-trimethyl-2,4,6-tris(3,5-di-t-butyl-4-hydroxybenzyl) benzene, 3,9-bis[1,1-dimethyl-2-{β-(3-t-butyl-4-hydroxy-5-methylphenyl) propionyloxy} ethyl]-2,4,8,10-tetraoxaspiro[5,5]-undecane, 2,2-bis[4-(2-)3,5-di-t-butyl-4-hydroxyhydrocinnamoyloxy)) ethoxyphenyl] propane, and alkyl esters of β-(3,5-di-t-butyl-4-hydroxyphenyl)propionic acid.

Many phenolic antioxidants (E) are commercially available. Some examples include Irganox® 1010 (pentaerythritol tetrakis(3-(3,5-di-t-butyl-4-hydroxyphenyl)propionate, available from BASF), Irganox® 1098 (1,6-hexamethylene bis(3,5-di-t-butyl-4-hydroxyhydrocinnamate, available from BASF), ADK STAB AO-80 (3,9-bis(2-(3-(3-t-butyl-4-hydroxy-5-methyl-phenyl)-propionyl-oxy)-1,1-dimethyl)-2,4,8,10-tetraoxospiro[5,5]undecane, available from Adeka Palmarole), Topanol® CA (1,1,3-tris(2-methyl-4-hydroxy-5-t-butylphenyl)butane, available from Vertellus Specialties), Irganox® 1330 (1,3,5-trimethyl-2,4,6-tris(3,5-di-t-butyl-4-hydroxybenzyl)benzene, available from BASF), Hostanox® O3 (butyric acid, 3,3-bis(3-t-butyl-4-hydroxyphenyl)ethylene ester, available from Clariant), Irganox® 3114 (1,3,5-tris(3',5'-di-t-butyl-4'-hydroxybenzyl)-s-triazine-2,4,6-(1H, 3H,5H)trione, available from BASF), Cyanox® 1790 (1,3,5-tris(4-t-butyl-2,6-dimethyl-3-hydroxy-benzyl)-isocyanurate, available from Cytec), and Iragnox® 245 (triethylene-glycol-bis-3-(t-butyl-4-hydroxy-5-methyl-phenyl)propionate, available from BASF).

The amount of the phenolic antioxidant (E) in the resin composition of the invention can vary and may, for instance, be 0.01-1% by total weight of the resin composition, such as 0.05-0.9% by total weight of the resin composition, or 0.1-0.8% by total weight of the resin composition.

The resin composition of the invention can suitably also comprise an antioxidant (F) selected from the class of secondary antioxidants. The secondary antioxidant (F) is different from phenolic antioxidant (B) and phenolic antioxidant (E), which are both primary antioxidants. The difference between primary and secondary antioxidants is well-known in the art. Primary antioxidants are typically organic molecules consisting of hindered phenol and amine derivatives. These primary antioxidants are radical scavengers and are usually added to polymers to protect against degradation during the service life of the finished product. Phosphites and phophonites are examples of secondary antioxidants.

Secondary antioxidants can prevent formation of additional free radicals by decomposing unstable hydroperoxides into stable alcohols and are usually added to polymers to provide processing stability during the pelletisation and extrusion and/or moulding processes. When primary antioxidants, such as hindered phenols, are utilised, polyolefins can develop a more yellow colour, decreasing the commercial value of the polyolefins. Secondary antioxidants, such as phosphite compounds, are often utilised in polyolefins in combination with hindered phenols to increase the stability and decrease yellowing.

Some examples of suitable secondary antioxidants (F) include organic phosphites and phosphonites, such as triphenyl phosphite, diphenyl alkyl phosphites, phenyl dialkylphoshites, tris(nonylphenyl)phosphite, tris(2,4-di-t-butylphenyl)phosphite, bis(2,4-di-t-butylphenyl)pentaerythritol diphosphite, bis(2,6-di-t-butyl-4-methylphenyl) pentaerythritol diphosphite, bis(2,4-di-t-butyl-6-methylphenyl)pentaerythritol diphosphite, bis(2,4,6-tri-t-butylphenyl)pentaerythritol diphosphite, tetrakis(2,4-di-t-butylphenyl)-4,4'-biphenylenediphosphonite, bis(2,4-di-t-butyl-6-methylphenyl)methyl phosphite, and bis(2,4-di-t-butyl-6-methylphenyl)ethyl phosphite. Some preferred secondary phenolic antioxidants are tris(2,4-di-t-butylphenyl)phosphite, bis(2,4-di-t-butyl-6-methylphenyl)ethyl phosphite, bis(2,4-di-t-butylphenyl) pentaerythritol diphosphite, and tetrakis(2,4-di-t-butylphenyl)-4,4'-biphenylenediphosphonite. The most preferred secondary phenolic antioxidant is tris(2,4-di-t-butylphenyl)phosphite.

Many of these secondary phenolic antioxidants are commercially available. Some examples include Irgafos® 168 (tris(2,4-di-t-butylphenyl)phosphite, available from BASF), and Irgafos® P-EPQ (tetrakis(2,4-di-t-butylphenyl)[1,1-biphenyl]-4,4'-diylbisphosphonite, available from BASF).

The amount of the antioxidant (F) in the resin composition of the invention can vary and may, for instance, be 0.01-1% by total weight of the resin composition, such as 0.05-0.9% by total weight of the resin composition, or 0.1-0.8% by total weight of the resin composition.

Besides antioxidants (B), (E) and (F), the resin composition of the invention can also comprise non-phenolic antioxidants, such as hydroxyl amines. Useful hydroxylamine stabilisers include, for example, N,N-dibenzylhydroxylamine, N,N-diethylhydroxylamine, N,N-dibutylhydroxylamine, N,N-dihexylhydroxylamine, the N,N-dialkylhydroxylamine derived from oxidation of hydrogenated tallow amine, and hydroxyl amines of the general formula RN(OH)R', in which R and R' are each independently alkyl groups of eight to eighteen carbon atoms, such as N,N-dioctylhydroxylamine, N,N-didecylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-octadecylhydroxylamine, and N-heptadecyl-N-octadecylhydroxylamine. Preferable, the hydroxyl amine is bis(octadecyl)hydroxylamine supplied by BASF as Irgastab® FS 042.

In an embodiment, the resin composition of the invention comprises
  60-95% by total weight of the resin composition of the polypropylene resin (A), preferably 55-90%;
  0.01-1% by total weight of the resin composition of the phenolic antioxidant (B), preferably 0.05-0.9%, more preferably 0.1-0.4%,
  0.01-1% by total weight of the resin composition of the hindered amine light stabiliser (C), preferably 0.05-0.9%, more preferably 0.1-0.4%,
  0.01-0.8% by total weight of the resin composition of the thiosynergist (D), preferably 0.01-0.06%,
  0-1% by total weight of the resin composition of the phenolic antioxidant (E), preferably 0.05-0.9%, more preferably 0.1-0.8%, and
  0-1% by total weight of the resin composition of the antioxidant (F), preferably 0.05-0.9%, more preferably 0.1-0.8%.

In addition to the components described above, the resin composition of the invention may comprise further additives. Some examples of suitable additives include colourants, nucleating agents, clarifiers, release agents, pigments, dyes, plasticisers, antioxidants, anti-statics, scratch resistance agents, fillers, impact modifiers, flame retardants, blowing agents, recycling additives, coupling agents, antimicrobials, anti-fogging additives, slip additives, anti-blocking agents, polymer processing aids, such as lubricants and the like, surface tension modifiers, co-agents, components that enhance interfacial bonding, etc. Such additives are well-known in the art. The amount of additives depends on their type and function. Typically, their amounts can vary from 0-30% by total weight of the resin composition, 0-20% by total weight of the resin composition, 0-10% by total weight of the resin composition, or 0-5% by total weight of the resin composition.

It is preferred that the resin composition of the invention comprises one or more colourants. These colourants may be organic colourants, inorganic colourants, or mixtures thereof. Typically, the colourants can be dyes or pigments such as titanium dioxide, copper phthalocyanine, and carbon black. Such colourants can provide the resin composition of the invention with a colour. Generally, the colourant is present in the resin composition of the invention in an amount of 0.05% or more by total weight of the resin composition. Usually, the amount of colourant does not exceed 5% by total weight of the resin composition.

It is preferred that the resin composition of the invention comprises at least a filler, such as an inorganic filler. Examples of inorganic filler include talc, calcium carbonate, calcium oxide, calcium hydroxide, magnesium carbonate, magnesium hydroxide, magnesium oxide, aluminium hydroxide, magnesium sulphate, barium sulphate, glass powder, clay, dolomite, mica, silica, alumina, potassium titanate, wollastonite, fibrous magnesium oxysulphate, and glass fibre. These inorganic fillers may be used alone or in any combination of two or more thereof. Talc, calcium carbonate, barium sulphate and fibrous magnesium oxysulphate are particularly preferred as inorganic filler.

In a suitable embodiment, the resin composition of the invention comprises talc. Talc can be categorised as a hydrated magnesium silicate and its main components can be represented by, amongst others, one or more of the formulas $(Si_2O_5)_2Mg_3(OH)_2$, $Si_8Mg_6O_{20}(OH)_4$ or $Mg_{12}Si_{16}O_{40}(OH)_8$. Suitably, the talc may be surface-treated talc or surface-coated talc, for example talc which is treated with a surface modifier such as one or more selected from the group consisting silanes, amines, glycols, stearates, sorbates and titanates.

The amount of inorganic filler in the resin composition of the invention may, for instance, be 0-30% by total weight of the resin composition, such as 1-25% by total weight of the resin composition, or 2-20% by total weight of the resin composition.

The resin composition of the invention may further comprise from 1-25% by total weight of the resin composition, of an ethylene α-olefin copolymer elastomer. Such ethylene α-olefin copolymer elastomer is preferably selected from one or more of ethylene-butene copolymer elastomer, ethylene-hexene copolymer elastomer and ethylene-octene copolymer elastomer. Even more preferably the ethylene α-olefin copolymer elastomer is selected from one or more of an metallocene ethylene-octene copolymer-elastomer and a metallocene ethylene-butene copolymer elastomer. Typically, these elastomers are added to further improve the impact resistance. The density of such elastomers may be from 860-885 kg/m$^3$. The melt flow index for the elastomer may be from 0.10-10 g/10 min (ISO 1133, 2.16 kg, 230° C.).

The amount of elastomer in the resin composition of the invention may, for instance, be 0-25% by total weight of the resin composition, such as 1-20% by total weight of the resin composition, or 2-15% by total weight of the resin composition.

The resin composition of the invention may be transformed into shaped (semi-)finished articles using a variety of processing techniques. Examples of suitable processing techniques include injection moulding, injection compression moulding, thin wall injection moulding, extrusion, and extrusion compression moulding. Injection moulding is widely used to produce articles such as caps and closures, batteries, pails, containers, automotive exterior parts like bumpers, automotive interior parts like instrument panels, or automotive parts under the bonnet. Extrusion is widely used to produce articles such as rods, sheets and pipes. Thin wall injection moulding may for example be used to make thin wall packaging.

Processes for preparing the resin composition of the invention can be any process known in the art to compound liquid or solid ingredients into a polymer. Examples thereof include extruder mixing, mixing in a Banbury type equipment, solution blending etc.

Hence, in a further aspect the invention is directed to an article comprising the resin composition of the invention, typically a shaped article, such as a three-dimensional article.

The article of the invention advantageously has improved properties in respect of heat resistance and resistance against ultraviolet radiation.

The article of the invention preferably has a tensile yield strength retention of 90% or more, preferably 92% or more, more preferably 94% or more, such as 95% or more after air oven exposure at 120° C. during 1000 hours. Tensile properties were determined in accordance with ISO 527-1A and were measured at 23° C.

The article of the invention further preferably has an Izod impact strength retention upon air oven exposure at 120° C. during 1000 hours of 90% or more, preferably 92% or more, more preferably 94% or more, such as 95% or more. The Izod impact strength was determined in accordance with ISO 180-1A and was measured at −40° C. and 23° C.

The article of the invention preferably has a grey scale value of 4 or more, preferably 4.5 or more, such as 4.5-5 after 3609 kJ/m$^2$ irradiation (ultraviolet interior test protocol FLTM-BO 116-01). Grey scale assessment was determined according to ISO 105A02.

In yet a further aspect, the invention is directed to the use of a combination of
(B) an optionally substituted linear or branched alkyl ester of 3-(alkylated 4'-hydroxyphenyl) propionic acid having a molecular weight of 750 g/mol or less,
(C) a hindered amine light stabiliser, having a molecular weight of 1250 g/mol or more, wherein the hindered amine is comprised in the backbone of the hindered amine light stabiliser molecule,
(D) a thiosynergist,
optionally further comprising one or more selected from
(E) a phenolic antioxidant different from (B), and
(F) an antioxidant different from (B) and (E), selected from the group of secondary antioxidants,
for stabilising a resin composition.

Preferably said resin combination is used for stabilising a polyolefin resin composition, such as a polypropylene resin composition, a polyethylene resin composition, or any mixture thereof.

For the purpose of clarity and a concise description features are described herein as part of the same or separate embodiments, however, it will be appreciated that the scope of the invention may include embodiments having combinations of all or some of the features described.

The invention will now be further elucidated by means of the following examples, which are not intended to limit the scope of the invention in any way.

EXAMPLES

Experimental methods.
Testing of Physical Properties

Injection moulded tensile bars (ISO 527-1A test bars) and notched Izod bars cut from these injection moulded tensile bars were air oven aged at 120° C. during 1000 hours. Tensile strength at yield was determined according to ISO 527-1A (T=23° C., II). Impact strength is determined by measuring the Izod impact strength at 23° C. or at −40° C. according to ISO 180-1A (T=23° C., II) and ISO 180-1A (T=−40° C., II), respectively.

Mechanical evaluation for reference samples (0 hours ageing) has been performed on conditioned injection moulded tensile bars and notched Izod bars cut thereof. Conditioning took place during 1000 hours in standard lab conditions meaning an atmosphere having a relative humidity of 50±2% at a temperature of 23±1° C.
Appearance Assessment Greyscale value was determined in accordance with ISO 105A02. The greyscale is a scale from 5 to 1. Greyscale 5 represents no visual degradation and greyscale 1 represents severe visual degradation.

Colour measurements were done with a Macbeth CE-741 GL multi-angle, L*, a*, b*, and delta E* values (CIE), Geometry 75°, D65, 10° viewing angle. Additional colour measurements were done with a Minolta CM3700d spectrophotometer according to ISO 7742-2, L*, a*, b*, and delta E* values (CIE), D/8 Geometry, D65, 10° viewing angle.
FT-IR (ATR) Spectroscopy Chemical changes due to photooxidation were determined using attenuated total reflection infrared spectroscopy (FT-IR/ATR). Infrared spectra were recorded using a Perkin Elmer 1740/Spectrum One instrument equipped with a diamond crystal, spectral resolution was set at 4 cm$^{-1}$. All spectra were normalised by setting the 1460 cm$^{-1}$ absorbance to a value of 0.1. The absorbance at 1772 cm$^{-1}$ was then used as a measure of degree of oxidation ($N_{ox}$) in the surface layer of the plaques. Degree of surface oxidation ($N_{ox}$) was determined in course of the accelerated UV-ageing.
Thermal and UV Ageing Thermal ageing was performed using a forced air circulation oven provided by Vötsch Industrietechnik, more accurately model NTU 60/60 provided with a calibrated air flow meter (set at 150 air changes per hour). The ability to withstand thermooxidative stress in applications for a sufficient long time is traditionally determined using such oven ageing.

Ultraviolet exposure ageing of injection moulded plaques (65×65×3.2 mm) with VW K59 texture was carried out according to the interior test protocol FLTM-BO 116-01 prescribing ultraviolet radiation intensity of 1.06 W/m$^2$/nm at 420 nm, xenon light filtering consisting of quartz inner and borosilicate outer filters and additional filter lantern equipped with SF-5 filters, black panel temperature of 89° C. and light:dark cycle 3.8:1 hours. Subsequently, the greyscale value was determined in accordance with ISO 105A02 (requirement: rating of minimum 4 after 3609 kJ/m² received radiation or 1165 hours total test duration). The greyscale is a scale from 5 to 1. Greyscale 5 represents no visual degradation and greyscale 1 represents severe visual degradation. Colour measurements were done with a Macbeth CE-741 GL multi-angle, L*, a*, b*, and delta E* values (CIE), Geometry 75°, D65, 10° viewing angle. Additional colour measurements were done with a Minolta CM3700d spectrophotometer according to ISO 7742-2, L*, a*, b*, and delta E* values (CIE), D/8 Geometry, D65, 10° viewing angle. Also chemical changes due to photooxidation were determined using attenuated total reflection infrared spectroscopy (FT-IR/ATR). The degree of surface oxidation ($N_{ox}$) was determined in course of the accelerated UV-ageing.

Sample Preparation

Several samples were prepared using (a polymer blend of) two starting materials having a melt flow index (MFI) of 14.5 and 67, respectively. In addition to these two reactor copolymers, the compositions contained rubbers, fillers, stabilisers, coupling agent, scratch agent, slip agent, siloxane polymer masterbatch and colour masterbatch.

The base composition of all samples is displayed in table 1.

TABLE 1

Base composition of the samples

| Component | Supplier | wt. % |
|---|---|---|
| Base Polymer SABIC ® PP513MNK10E | SABIC | 40-45 |
| Base polymer SABIC ®PP48M10 | SABIC | 20 |
| Elastomer Rubbers- PE s- Oils mPE Oct-870-50 (alt. Engage 8200/8207) | Dow | 13 |
| Fillers Imi Fabi Ultra 5C | Imi Fabi | 18 |
| Antioxidant Irganox B225 | BASF | 0.2 |
| Coupling Agent (Exxelor PO1020) | Exxelor | 0.2 |
| MB50-001 (Siloxane MB) | Dow Corning | 3 |

TABLE 1-continued

Base composition of the samples

| Component | Supplier | wt. % |
|---|---|---|
| Erucamide < 1999 (Crodamide ER Microbead) | Croda | 0.3 |
| CMB CC 10136267BG (Medium Stone) | PolyOne | 3 |

The composition of the examples (7 kg) was compounded in a twin screw ZE21 extruder. The temperature profile in the extruder was 80-210° C., at a throughput of 4 kg/h at 750 rpm.

Example 1

Additional to the mentioned base composition following stabilisers were added in comparative and inventive examples (tables 2 and 3). Different hindered amine light stabilisers Chimassorb® 944 (poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]), available from BASF), Chimassorb® 119 (1,5,8,12-tetrakis[4,6-bis(N-butyl-N-1,2,2,6,6-pentamethyl-4-piperidylamino)-1,3,5-triazin-2-yl]-1,5,8,12-tetraazadodecane, available from BASF), Tinuvin® NOR371 (a triazine derivative available from BASF), Uvinul® 4050H (N,N'-bisformyl-N,N'-bis-(2,2,6,6-tetramethyl-4-piperidinyl)-hexamethylendiamine, available from BASF) in comparative examples and Tinuvin® 622 (poly(4-hydroxy-2,2,6,6-tetramethyl-1-piperidine ethanol-alt-1,4-butanedioic acid), available from BASF) in the inventive example were evaluated. Furthermore phenolic antioxidants Irganox® 1076 (octadecyl-3-(3,5-di-t-butyl-4-hydroxyphenyl)propionate, available from BASF) and Cyasorb® UV2908 (3,5-di-t-butyl-4-hydroxybenzoic acid, hexadecyl ester, available from Cytec). Distearyl thiodipropionate (DSTDP) was also supplied by BASF.

Determination of change in Izod impact strength (23° C. and −40° C.) and tensile yield strength (23° C.) after 1000 hours ageing under high heat exposure conditions (120° C.), in a forced air circulation oven for thermal (artificial) ageing provided with a calibrated air flow meter. The mechanical data on tensile yield and impact strength retention of the samples are shown in table 2.

The degree of surface oxidation ($N_{ox}$) was determined in course of the accelerated UV-ageing and the values provided in table 3 correspond to 1195 hours total test duration.

TABLE 2

Mechanical data on tensile yield and impact strength retention after prescribed heat ageing

|  | A[1] | B[1] | C[1] | D[1] | E[1] | F[2] |
|---|---|---|---|---|---|---|
| Chimassorb 944 | 0.4 |  |  |  |  |  |
| Chimassorb 119 |  | 0.4 | 0.4 |  |  |  |
| Tinuvin 622 |  |  |  |  |  | 0.4 |
| Tinuvin NOR 371 |  |  |  | 0.4 |  |  |
| Uvinul 4050H |  |  |  |  | 0.4 |  |
| Irganox 1076 | 0.2 | 0.2 |  | 0.2 | 0.2 | 0.2 |
| Cyasorb UV2908 |  |  | 0.2 |  |  |  |
| DSTDP | 0.05 | 0.05 | 0.05 | 0.05 |  | 0.05 |
| Izod impact strength retention (23° C.) (%) | 79 | 93 | 90 | 87 | 79 | 99 |
| Izod impact strength retention (−40° C.) (%) | 85 | 83 | 84 | 88 | 94 | 97 |
| Tensile yield strength (23° C.) (%) | 107 | 104 | 105 | 106 | 107 | 104 |

[1]comparative example
[2]inventive example

TABLE 3

Visual appearance data after prescribed UV ageing

|  | A[1] | B[1] | C[1] | D[1] | E[1] | F[2] |
|---|---|---|---|---|---|---|
| Chimassorb 944 | 0.4 |  |  |  |  |  |
| Chimassorb 119 |  | 0.4 | 0.4 |  |  |  |
| Tinuvin 622 |  |  |  |  |  | 0.4 |
| Tinuvin NOR 371 |  |  |  | 0.4 |  |  |
| Uvinul 4050H |  |  |  |  | 0.4 |  |
| Irganox 1076 | 0.2 | 0.2 |  | 0.2 | 0.2 | 0.2 |
| Cyasorb UV2908 |  |  | 0.2 |  |  |  |
| DSTDP | 0.05 | 0.05 | 0.05 | 0.05 |  | 0.05 |
| Greyscale after 1195 hours accelerated UV ageing | 5 | 5 | 5 | 5 | 5 | 5 |
| Degree of surface oxidation ($N_{ox}$) after 1195 hours accelerated UV ageing | 0.00342 | 0.01066 | 0.01154 | 0.00116 | 0.00756 | 0.00030 |

[1]comparative example
[2]inventive example

The inventive example containing the polyester hindered amine light stabiliser Tinuvin 622 shows surprisingly good performance in comparison to the comparative examples containing Chimassorb 944, Chimassorb 119, Uvinul 4050H and Tinuvin NOR 371, respectively, all in combination with Irganox 1076. The inventive example shows surprisingly good performance, both in heat ageing as well as in UV-ageing. This improved performance is believed to be related directly to its structure. Without wishing to be bound by any theory, the inventors believe that in order to generate the active species for radical trapping, the polyester hindered amine light stabiliser must first begin to self-destruct. An advantage may be that due to its self-destruction, lower molecular weight stabilising species are formed which are showing an increased mobility in a polymer matrix, and as such could have an enhanced ability to participate in radical trapping and peroxide decomposition reactions. Other possible explanations may involve compatibility, distribution of stabilising groups, etc.).

Example 2

Further comparative and inventive examples were prepared using a different batch of polypropylene (tables 4 and 5). Tinuvin® 622 and Irganox® 1076 were supplied by BASF.

Determination of change in Izod impact strength (23° C. and −40° C.) and tensile yield strength (23° C.) after 1200 hours ageing under high heat exposure conditions (120° C.), in a forced air circulation oven for thermal (artificial) ageing provided with a calibrated air flow meter. The mechanical data on tensile yield and impact strength retention of the samples are shown in table 4.

The degree of surface oxidation ($N_{ox}$) was determined in course of the accelerated UV-ageing and the values provided in table 5 correspond to 1195 hours total test duration.

TABLE 4

Mechanical data on impact strength retention after prescribed heat ageing during 1200 hours

|  | G[1] | H[1] | I[2] |
|---|---|---|---|
| Tinuvin 622 | 0.4 | 0.4 | 0.4 |
| Irganox 1076 | 0.2 |  | 0.2 |
| DSTDP |  | 0.05 | 0.05 |
| Izod impact strength retention (23° C.) (%) | 88 | 94 | 92 |

[1]comparative example
[2]inventive example

TABLE 5

Visual appearance data after prescribed UV ageing

|  | G[1] | H[1] | I[2] |
|---|---|---|---|
| Tinuvin 622 | 0.4 | 0.4 | 0.4 |
| Irganox 1076 | 0.2 |  | 0.2 |
| DSTDP |  | 0.05 | 0.05 |
| Greyscale after 1195 hours accelerated UV ageing | 5 | 5 | 5 |
| Degree of surface oxidation ($N_{ox}$) after 1195 hours accelerated UV ageing | 0.00146 | 0.00422 | 0.00112 |

[1]comparative example
[2]inventive example

The inventive example containing both the alkyl ester of 3-(alkylated-4-'hydroxyphenyl) propionic acid and the thiosynergist shows surprisingly good performance in comparison to the comparative examples, in particular with respect to the combination of Izod impact strength retention and the degree of surface oxidation.

The invention claimed is:
1. A resin composition comprising
   (A) a polypropylene resin,
   (B) an optionally substituted linear or branched alkyl ester of 3-(alkylated 4'-hydroxyphenyl) propionic acid having a molecular weight of 750 g/mol or less,
   (C) a hindered amine light stabiliser, having a molecular weight of 1250 g/mol or more, wherein the hindered amine is comprised in the backbone of the hindered amine light stabiliser molecule, and
   (D) a thiosynergist comprising a sulphur-based hydroperoxide decomposer.
2. A resin composition according to claim 1, further comprising
   (E) a phenolic antioxidant different from (B).
3. A resin composition according to claim 1, further comprising

(F) an antioxidant different from (B) and (E), selected from the group consisting of secondary antioxidants and non-phenolic antioxidants.

4. A resin composition according to claim 1, wherein said a polypropylene resin (A) is a heterophasic polypropylene comprising a polypropylene homopolymer matrix phase and a disperse propylene/α-olefin elastomeric copolymer phase.

5. A resin composition according to claim 1, wherein said phenolic antioxidant (B) has one phenolic group per molecule.

6. A resin composition according to claim 1, wherein the phenolic antioxidant (B) is selected from the group consisting of
$C_{1-20}$-3-(3,5-di-t-butyl-4-hydroxyphenyl)propionates, preferably the phenolic antioxidant (B) is selected from the group consisting of
methyl-3-(3,5-di-t-butyl-4-hydroxyphenyl)propionate,
octyl-3-(3,5-di-t-butyl-4-hydroxyphenyl)propionate,
isooctyl-3-(3,5-di-t-butyl-4-hydroxyphenyl)propionate,
tridecyl-3-(3,5-di-t-butyl-4-hydroxyphenyl)propionate,
tetradecyl-3-(3,5-di-t-butyl-4-hydroxyphenyl)propionate,
heptadecyl-3-(3,5-di-t-butyl-4-hydroxyphenyl)propionate,
hexadecyl-3-(3,5-di-t-butyl-4-hydroxyphenyl)propionate,
heptadecyl-3-(3,5-di-t-butyl-4-hydroxyphenyl)propionate,
octadecyl-3-(3,5-di-t-butyl-4-hydroxyphenyl)propionate, and
nonadecyl-3-(3,5-di-t-butyl-4-hydroxyphenyl)propionate.

7. A resin composition according to claim 1, wherein said hindered amine light stabiliser (C) has a molecular weight of from 1500-4000 g/mol.

8. A resin composition according to claim 1, wherein said hindered amine light stabiliser (C) comprises a group according to formula (I) in the backbone

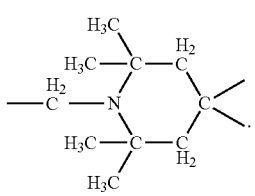

(I)

9. A resin composition according to claim 1, wherein said hindered amine light stabiliser (C) comprises a group according to formula (II) in the backbone

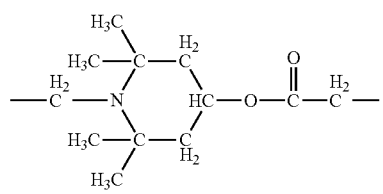

(II)

10. A resin composition according to claim 1, wherein said hindered amine light stabiliser (C) comprises a group according to formula (III) in the backbone

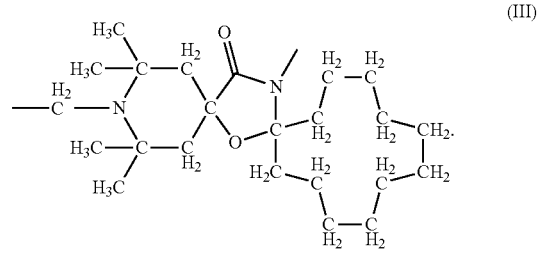 [SMILES: CCN1C(C)(C)CC2(CC1(C)C)OC1(CCCCCCCCCCC1)N(C)C2=O]

(III)

11. A resin composition according to claim 1, wherein the hindered amine light stabiliser (C) is selected from the group consisting of

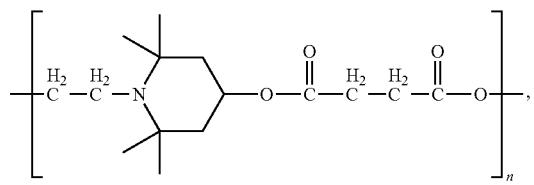

wherein n is in the range of 9-16, and

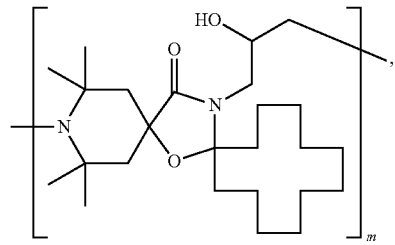

wherein m is in the range of 3-10.

12. A resin composition according to claim 11, wherein the hindered amine light stabiliser (C) is (poly(4-hydroxy-2,2,6,6-tetramethyl-1-piperidine ethanol-alt-1,4-butanedioic acid), or a polymer of 2,2,4,4-tetramethyl-7-oxa-3,20-diaza-dispiro[5.1.11.2]-heneicosan-21-on and epichlorohydrin.

13. A resin composition according to claim 1, wherein the resin composition is substantially free from hindered amine light stabilisers having a molecular weight of less than 1250 g/mol.

14. A resin composition according to claim 1, wherein the resin composition is completely free from hindered amine light stabilisers having a molecular weight of less than 1250 g/mol.

15. A resin composition according to claim 1, wherein said thiosynergist (D) is selected from the group consisting of dilauryl thiodipropionate, distearyl-3,3'-thiodipropionate and neopentanetetrayl tetrakis(3-dodecylthiopropionate).

16. Resin composition according to claim 1, wherein said thiosynergist is distearyl-3,3'-thiodipropionate.

17. A resin composition according to claim 1, wherein said phenolic antioxidant (E) has two or more phenolic groups per molecule.

18. A resin composition according to claim 1, wherein said phenolic antioxidant (E) is selected from the group consisting of
2,2'-methylenebis(4-methyl-6-t-butylphenol),
4,4'-butylidenebis(3-methyl-6-t-butylphenol), 4,4'-thiobis(3-methyl-6-t-butylphenol),
2,2'-thiobis(4-methyl-6-t-butylphenol),
4,4'-methylenebis(2,6-di-t-butylphenol),
2,2'-methylenebis[6-(1-methylcyclohexyl)-p-cresol],
2,2'-ethylidenebis(2,4-di-t-butylphenol),
2,2'-butylidenebis(2-t-butyl-4-methylphenol),
1,1,3-tris(2-methyl-4-hydroxy-5-t-butylphenyl)butane,
triethylene glycol-bis[3-(3-t-butyl-5-methyl-4-hydroxyphenyl)propionate],
1,6-hexanediol-bis[3-(3,5-di-t-butyl-4-hydroxyphenyl)propionate],
2,2-thiodiethylenebis[3-(3,5-di-t-butyl-4-hydroxyphenyl)propionate],
N,N'-hexamethylenebis(3,5-di-t-butyl-4-hydroxyhydrocinnamide),
3,5-di-t-butyl-4-hydroxybenzylphosphonate-diethyl ester
1,3,5-tris(2,6-dimethyl-3-hydroxy-4-t-butylbenzyl)isocyanurate,
1,3,5-tris[(3,5-di-t-butyl-4-hydroxyphenyl)propionyloxyethyl]isocyanurate,
tris(4-t-butyl-2,6-dimethyl-3-hydroxybenzyl)isocyanurate,
2,4-bis(n-octylthio)-6-(4-hydroxy-3,5-t-butylanilino)-1,3,5-triazine,
tetrakis[methylene-3-(3,5-di-t-butyl-4-hydroxyphenyl)propionate] methane,
bis(3,5-di-t-butyl-4-hydroxybenzylphosphonic acid ethyl ester) calcium,
bis(3,5-di-t-butyl-4-hydroxybenzylphosphonic acid ethyl ester) nickel,
bis[3,3-bis(3-t-4-hydroxyphenyl)butyric acid] glycol ester,
N,N'-bis[3,5-di-t-butyl-4-hydroxyphenyl)propionyl]hydrazine,
2,2'-oxaimidobis[ethyl-3-(3,5-di-t-butyl-4-hydroxyphenyl)propionate],
2,2'-methylenebis(4-methyl-6-t-butylphenol)terephthalate,
1,3,5-trimethyl-2,4,6-tris(3,5-di-t-butyl-4-hydroxybenzyl) benzene,
3,9-bis[1,1-dimethyl-2-{13-(3-t-butyl-4-hydroxy-5-methylphenyl)propionyloxy} ethyl]-2,4,8,10-tetraoxaspiro[5,5]-undecane,
2,2-bis[4-(2-)3,5-di-t-butyl-4-hydroxyhydrocinnamoyloxy))ethoxyphenyl] propane, and
alkyl esters of β-(3,5-di-t-butyl-4-hydroxyphenyl)propionic acid.

19. A resin composition according to claim 1, wherein the antioxidant (F) is selected from the group consisting of phosphite secondary antioxidants.

20. A resin composition according to claim 1, wherein the antioxidant (F) is selected from the group consisting of
tris(nonylphenyl)phosphite, tris(2,4-di-i-butylphenyl) phosphite,
bis(2,4-di-i-butylphenyl)pentaerythritol diphosphite,
bis(2,6-di-i-butyl-4-methylphenyl) pentaerythritol diphosphite,
bis(2,4-di-i-butyl-6-methylphenyl)pentaerythritol diphosphite,
bis(2,4,6-tri-i-butylphenyl)pentaerythritol diphosphite,
tetrakis(2,4-di-i-butylphenyl)-4,4'-biphenylenediphosphonite,
bis(2,4-di-i-butyl-6-methylphenyl)methyl phosphite, and
bis(2,4-di-i-butyl-6-methylphenyl)ethyl phosphite,
more preferably the antioxidant (F) is selected from
tris(2,4-di-i-butylphenyl)phosphite, bis(2,4-di-i-butyl-6-methylphenyl)ethyl phosphite, bis(2,4-di-i-butylphenyl) pentaerythritol diphosphite, and
tetrakis(2,4-di-i-butylphenyl)-4,4'-biphenylenediphosphonite,
most preferably the antioxidant (F) is tris(2,4-di-i-butylphenyl)phosphite.

21. A resin composition according to claim 1, wherein said resin composition further comprises a talc inorganic filler.

22. A resin composition according to claim 21, wherein the talc inorganic filler has an average particle diameter of 5 μm or less.

23. A resin composition according to claim 1, wherein said resin composition further comprises one or more colourants.

24. An article comprising a resin composition according to claim 1.

25. An article according to claim 24, wherein said article has a tensile yield strength retention of 90% or more after air oven exposure at 120° C. during 1000 hours.

26. An article according to claim 24, wherein said article has an Izod impact strength retention of 90% or more upon air oven exposure at 120° C. during 1000 hours.

27. An article according to claim 24, wherein said article has a greyscale value of 4 or more after 3609 kJ/m$^2$ irradiation.

28. A method of stabilising a resin composition, comprising combining
(A) a resin,
(B) an optionally substituted linear or branched alkyl ester of 3-(alkylated 4'-hydroxyphenyl) propionic acid having a molecular weight of 750 g/mol or less,
(C) a hindered amine light stabiliser, having a molecular weight of 1250 g/mol or more, wherein the hindered amine is comprised in the backbone of the hindered amine light stabiliser molecule, and
(D) a thiosynergist comprising a sulphur-based hydroperoxide decomposer, optionally further comprising one or more selected from
(E) a phenolic antioxidant different from (B), and
(F) an antioxidant different from (B) and (E), selected from the group of secondary antioxidants.

29. A method according to claim 28, wherein the resin composition is a polyolefin resin composition.

30. A resin composition of claim 1 comprising
(A) a heterophasic polypropylene comprising a polypropylene homopolymer matrix phase and a disperse propylene/α-olefin elastomeric copolymer phase,
(B) octadecyl-3-(3,5-di-t-butyl-4-hydroxyphenyl)propionate,
(C) (poly(4-hydroxy-2,2,6,6-tetramethyl-l-piperidine ethanol-alt-1,4-butanedioic acid), or a polymer of 2,2,4,4-tetramethyl-7-oxa-3,20-diaza-dispiro[5.1.11.2]-heneicosan-21-on and epichlorohydrin, and
(D) dilauryl thiodipropionate, distearyl-3,3'-thiodipropionate, or neopentanetetrayl tetrakis(3-dodecylthiopropionate).

31. A resin composition according to claim 30, further comprising one or both of
(E) a phenolic antioxidant different from (B) and having two or more phenolic groups per molecule, and
(F) an antioxidant different from (B) and (E), selected from the group consisting of phosphite secondary antioxidants.

* * * * *